Aug. 10, 1965       F. N. MOORE       3,199,403
PROJECTION SYSTEM

Filed June 7, 1962       2 Sheets-Sheet 1

INVENTOR.
FRANK N. MOORE
BY
Ooms, McDougall & Hersh
Attys.

INVENTOR.
FRANK N. MOORE

United States Patent Office 3,199,403
Patented Aug. 10, 1965

3,199,403
PROJECTION SYSTEM
Frank N. Moore, 8109 Dorchester Ave., Chicago, Ill.
Filed June 7, 1962, Ser. No. 200,812
2 Claims. (Cl. 88—24)

This invention relates to an improved projection system. The invention is particularly concerned with the formation of enlarged images on a screen in a manner such that the material thereon can be conveniently and effectively viewed.

There are in existence a great many systems capable of projecting information onto screens and the like. In most cases, a large screen is located in an upright position on a wall or in some other manner, and a projector directs images at the screen. In order to achieve an image of substantial size on the screen, it is necessary to locate the projector a relatively great distance away from the screen. Such units are, therefore, not suitable where space is limited.

Even if sufficient space is available, units which include a projector and large screen are undesirable if it is necessary to display information without disturbing all persons in a room. Thus, in many cases, one person or a small group may wish to view some material while others are engaged in other activities and do not wish to be distracted. If a large screen and a great deal of space are necessary for projection, such viewing on a small scale is not possible.

There are available projectors which are designed for viewing by individuals or small groups. Such projectors, for example, can be designed for studying microfilms or other films or slides, and with the material disposed in a projector, information can be displayed on a relatively small screen. Existing devices of this type are, however, unsatisfactory for various reasons. The units generally include relatively expensive housings, screens and reflecting means and the cost of these units has prevented use of the devices on a large scale in schools or the like. Furthermore, some devices require the use of specific projectors and they, therefore, lack versatility for this reason.

A more basic objection to existing constructions concerns the large size of the housings which contain reflectors and viewing screens. It is known that the magnification of an image from a projector depends on the distance through which it travels before appearing on the screen. In order to provide sufficient magnification, relatively large distances between the reflectors and the screens are necessary, and this obviously requires the use of large units.

Finally, many existing units are not capable of operation in a completely satisfactory manner. In some, the operator must stand behind the unit to insert slides or films and, therefore, the operator cannot see the screen without changing positions. In other instances, the slides or film must be placed into the projector in a reverse reading fashion in order to get a correct reading image on the screen. This makes it difficult for the operator to orient himself and increases the likelihood of improper projection.

It is an object of this invention to provide an improved projection system which permits the display of magnified images on a screen in a manner such that the material can be studied in a convenient and effective fashion.

It is an additional object of this invention to provide a projection system which does not require the use of a large room for achieving projection and which is ideally suited for use by individuals or small groups without the danger of distracting individuals in close proximity to the projector.

It is a further object of this invention to provide a projection system which includes relatively inexpensive materials, which is highly versatile in its use, which is compact while being capable of achieving high magnification and which is simple and convenient to operate.

These and other objects of this invention will appear hereinafter and, for purposes of illustration, but not of limitation, specific embodiments of this invention are shown in the accompanying drawings in which FIGURE 1 is a perspective view illustrating the assembly of this invention including a projector and associated housing;

Figure 1:
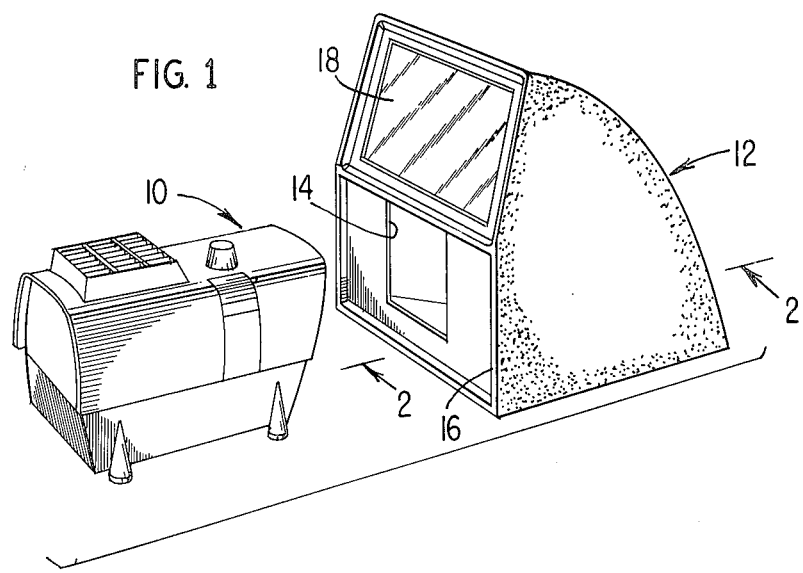

The present invention embodies an apparatus and method which are suitable for providing a projection system of an ideal character. Constructions which are characterized by the improvements of this invention include a pair of reflective surfaces usually disposed within a housing. The surfaces are located at an acute angle with respect to each other and a projected image is adapted to first contact one surface and to be reflected thereby onto the other surface. This second surface is located so that it will reflect the image back to the first surface and the image is then directed by this first surface to a viewing means.

In a typical embodiment, a first surface is disposed within a housing opposite an opening through which a projected image is directed. The second surface can be disposed approximately horizontally within the housing so that the projected image will be directed downwardly onto the second surface, back up to the first surface and then upwardly and outwardly to a viewing screen. This arrangement permits location of the viewing screen in an upper portion of the front wall of the housing. An opening can be located beneath this viewing screen in the front wall and the projector can be located in front of this opening. Therefore, the operator can stand behind the projector, direct its projections into the housing and then view the image on the viewing screen without changing position.

In a preferred form of this invention, one of the reflective surfaces is disposed along the bottom of a housing, and the other surface forms an angle of about 45° with respect to this surface. The apex of this angle is located near the rear of the housing and all reflections of these surfaces occur within the space defined by the angularly disposed surfaces. The use of an angle of about 45° has been found critical in most applications insofar as the production of images of near perfect definition is concerned.

With the component parts of the projection system situated in the manner described, the operator can place the slides or film in position and view the material at the same time. Furthermore, the unique reflecting arrangement of this invention is such that a correct reading image is provided on the screen without the need for reversing the material to be projected prior to placement in the projector.

The system of this invention can also be adapted for use in applications where the operator wishes to stand behind the viewing screen. To accomplish this, a periscope means can be integrated with the system, with the projected image then being directed away from the viewing apparatus and then redirected toward the apparatus and onto the viewing screen. The periscope means may include an enclosure having an opening through which the projector can direct the image. A reflecting surface opposite this opening is adapted to direct the image down an elongated passage to a second reflective surface. This surface then directs the image out through a second opening in the periscope means and into the opening formed in the viewer housing. The angularly arranged reflecting surfaces above described will then operate in the same manner to transmit the image to a viewing screen.

In a preferred form of this invention, the periscope means are provided with reflecting means at each end which include a pair of reflecting surfaces. The pair of surfaces at one end are adapted to provide two reflections of the image before transmitting the image down the passage of the periscope or through the opening of the periscope into the viewer housing.

The accompanying drawings will serve to illustrate specific forms which the system of this invention may take. There is shown in FIGURE 1 a projector 10 which may be of any conventional design. A viewer housing 12, disposed adjacent the projector, includes an opening 14 in the front wall 16. A viewing screen 18 is also located in the front wall above the opening 14. This screen is tilted rearwardly in order to facilitate viewing by an individual whose eye level would normally be above the level of the screen.

Figure 2:
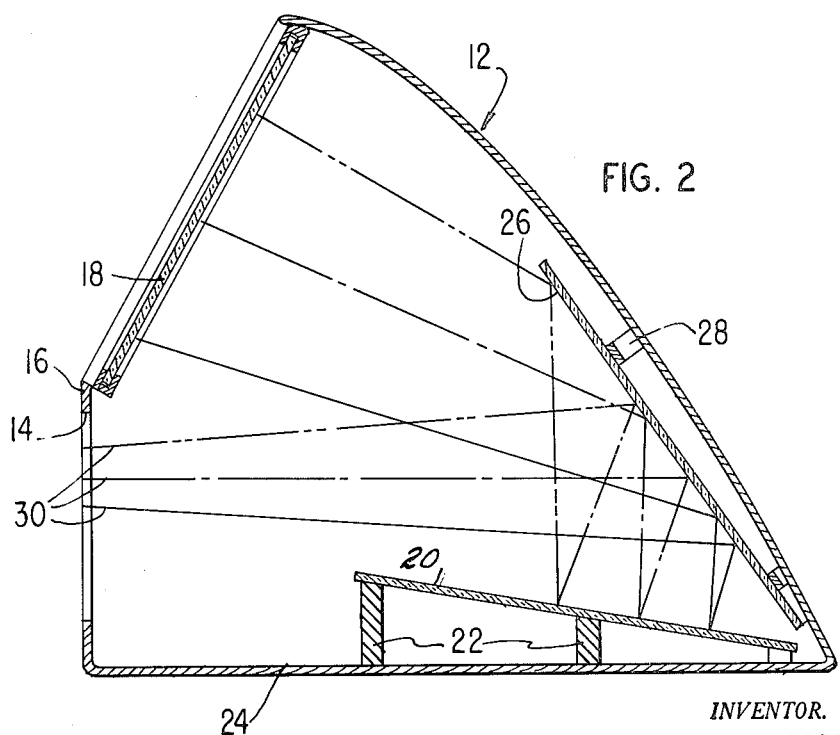
FIGURE 2 is an enlarged cross-sectional view, taken about the line 2—2 of FIGURE 1, illustrating the interior of the housing and the relative disposition of the reflecting means and viewing screen.

The projector 10 is adapted to direct images into the interior of the viewer housing. These images are reflected in a unique manner in accordance with this invention, and they are then transmitted to the screen 18. FIGURE 2 illustrates the reflecting structure which enables the projection of images in the manner described.

The reflecting structure includes a first reflective surface 20 mounted by means of supports 22 on the floor 24 of the housing. A second reflective surface 26 is angularly disposed with respect to the surface 20 and mounted on the housing by means of supports 28. The angle between these surfaces is preferably maintained at about 45° in order to provide the most satisfactory definition of the projected image. Slight variations from this angle are contemplated for specific applications. It has also been found that tilting of the surface 20 a slight amount with respect to the horizontal will provide for more suitable location of the image on the screen 18.

The image represented by the lines 30 is first directed onto the surface 26 and reflected thereby onto the surface 20. This latter surface is located to redirect the image to the surface 26 which is disposed to transmit the image onto the screen 18 for viewing purposes.

Figure 3:
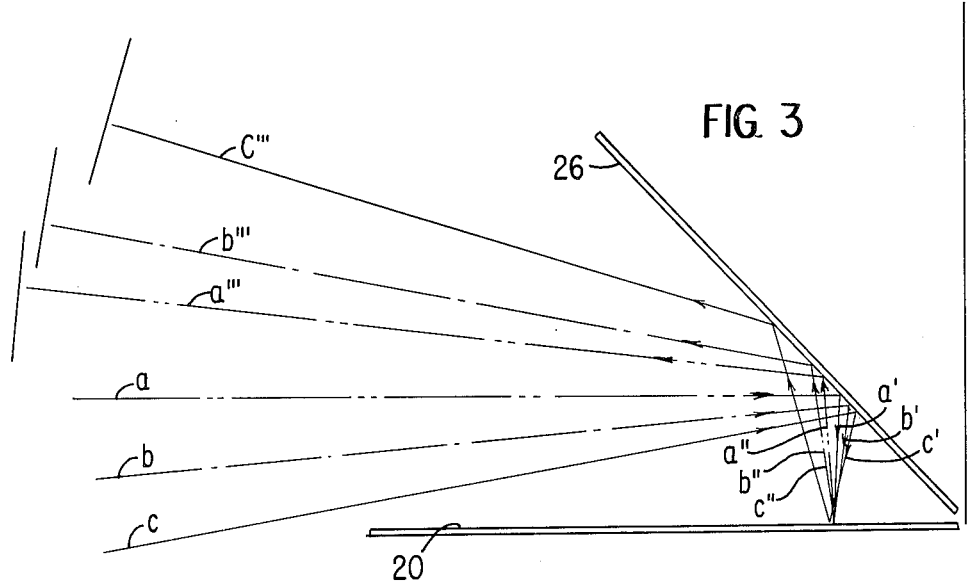
FIGURE 3 is a diagrammatic illustration of the paths taken by projected images in accordance with the principles of this invention.

FIGURE 3 illustrates schematically how the unique reflecting arrangement operates. Assuming that the line designated $a$ is the original image directed into the housing, the line $a'$ will represent the first reflection off the surface 26, the line $a''$ the redirected reflection off the surface 20 and the line $a'''$ the final reflection off the surface 26 to the screen 18.

If the angle of incidence of an original image is changed, as illustrated by the line $b$, then the lines $b'$, $b''$ and $b'''$ also change and, accordingly, the image on the viewing screen will be displaced. The displacement is more pronounced when considering the image represented by the line $c$ and the reflected images $c'$, $c''$ and $c'''$.

It will be apparent that by varying the angle of incidence, the position of the reflected image on the screen 18 can be varied. Variations of this nature can ordinarily be most easily accomplished by adjusting the angle of the beam from the projector and most projectors are provided with means for tilting the projector housing. However, the same variations can be accomplished by tilting the viewer housing or by providing means for relocating the position of the surfaces 20 and 26 without changing their included angle.

It will be noted that the distance of travel of the projected image is substantially greater than it would be if a simple reflection to the viewing screen were utilized. Therefore, a high magnification can be achieved with the system of this invention, since the magnification is a function of the distance travelled by the projected image. The system of this invention also enables the provision of a compact structure even though a relatively great distance of throw of the projected image is accomplished. Thus, all the reflections are confined to the two surfaces described and only a minimum amount of space for locating the reflecting means is necessary.

As previously noted, the structure of this invention is particularly suitable where the operator desires to stand facing the viewing screen. However, the mechanisms shown in FIGURES 4 and 5 permit the operator to stand behind the viewer housing, as may be desirable for lecture purposes. The mechanism shown in FIGURE 4 includes an elongated enclosure 32 defining a periscope means. A first opening 34 is located adjacent the projector 10 and a first reflective surface 36 is disposed opposite this opening. A second reflective surface 38 and an associated opening 40 are positioned at the other end of the enclosure.

Figure 4:
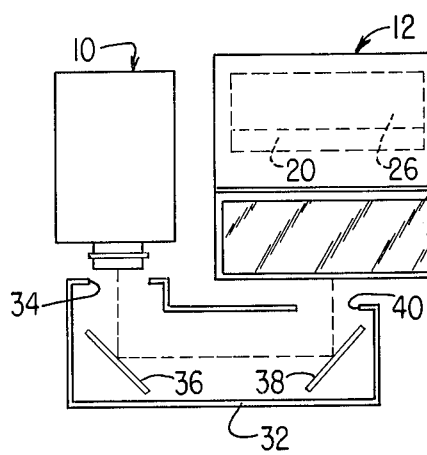
FIGURE 4 is a schematic illustration of a modified construction which includes a periscope means for use in combination with the projection system of this invention.

In the use of the apparatus shown in FIGURE 4 the image is first projected onto the surface 36 and then directed to the surface 38. This surface reflects the image through the opening 40 into the viewer housing 12. The housing, which is supplied with the reflective surfaces 20 and 26 above described, will then display the image on the viewing screen 18.

Figure 5:
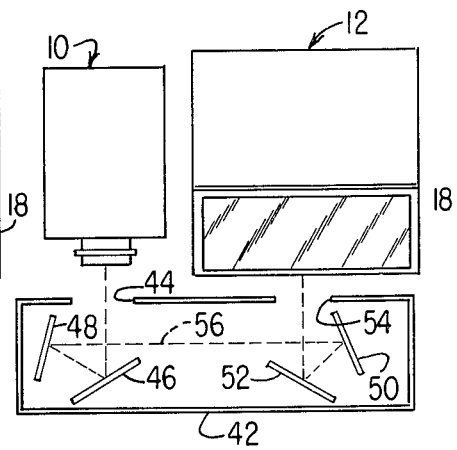
FIGURE 5 illustrates a construction characterized by an alternative periscope means for use in combination with the projection system of this invention.

An alternative periscope means defined by the enclosure 42 is shown in FIGURE 5. This device includes a first opening 44 and a pair of reflective surfaces 46 and 48, disposed adjacent this opening. A second pair of reflective surfaces 50 and 52 are disposed at the other end of the enclosure 42 and a second opening 54 is associated with this pair of surfaces.

In the use of the assembly shown in FIGURE 5, the image is first projected onto the surface 46 and then to the surface 48 whereby it is passed along the enclosure to the surface 50. This latter surface directs the image to the surface 52 and it is then transmitted into the viewer housing 12, for display on the screen 18 in the manner described.

With a periscope means of the type shown in FIGURE 5, an increased distance of throw for the image is achieved. Thus, the multiple reflections accomplished by means of this assembly result in an increase in the length of the path travelled by the projected image and greater magnification is, therefore, achieved. The surfaces of the pairs of reflectors 46 and 48 and 50 and 52 are preferably maintained at about 45° with respect to each other to provide maximum definition in the image displayed. Thus, these pairs of surfaces each comprise a unit which is essentially the same as the pair of surfaces disposed in the viewer housing. However, the surfaces are tilted about the apex of their included angle to the extent that the projected image does not reflect twice off the same surface. Thus, as shown in FIGURE 5, the image represented by the line 56 misses the surfaces 46 and 50 after it is reflected off the surfaces 48 and 52, respectively.

Where a greater distance of throw of the image is desired, the image reflected from the surface 48 can be redirected to the surface 46 and onto another pair of reflective surfaces. These in turn could transmit the image to one or more similar pairs of surfaces and ultimately to the projection screen. By employing a series of closely associated reflecting means in this manner, for example, a pair of opposing lines of reflecting means transmitting the image along a "zig-zag" path, the projected path of the image can be quite long although all mechanisms are located within an extremely small area. A projected image as large as is provided with a conventional projector and screen, spaced apart a relatively great distance, can be accomplished with this technique.

The reflecting surfaces employed in accordance with this invention may comprise any well known material utilized for similar purposes. Polished metal surfaces have been found to be particularly suitable for providing excellent image definition.

In the structures described which include periscope means, it is contemplated that these means could be directly integrated with the structure. However, these means can also be provided as a separate unit which could be assembled with the viewer housing when their use is desired. The projector and viewer of any of the described units could also be integrated into a single construction. However, the viewer housing is considered to have particularly desirable characteristics, since it can be utilized in combination with a large variety of projectors.

It will be appreciated that the present invention is intended to embrace all projecting means which utilize the described reflecting principles. Images projected onto a pair of reflective surfaces arranged in the manner described can be transmitted by the surfaces for various purposes other than onto a viewing screen.

It will be understood that various modifications may be made in the above described projection system which provide the characteristics of this invention without departing from the spirit thereof, particularly as defined in the following claims.

I claim:
1. In a system for projecting images onto a screen for viewing purposes which includes a projector and a housing adjacent thereto for holding said screen, the improvement comprising means defining a pair of reflective surfaces disposed within said housing, the first of said surfaces being disposed approximately horizontally and the second surface being positioned at an angle of about 45° with respect to said first surface, an opening defined by said housing in alignment with said second surface, said projector being positioned for passing an image through said opening and to said second surface, said projector and said surfaces being disposed so that the direction of throw of said image from said projector causes the image to reflect off said second surface to said first surface, back to said second surface whereby the separate projections on said second surface are superimposed, and then onto said screen.

2. In a system for projecting images onto a screen for viewing purposes which includes a projector and a housing adjacent thereto for holding said screen, the improvement comprising means defining a pair of reflective surfaces disposed within said housing, the first of said surfaces being disposed approximately horizontally and the second surface being positioned at an angle with respect to said first surface, an opening defined by said housing in alignment with said second surface, a periscope means comprising an enclosure, a reflecting means in said enclosure opposite a first opening, an elongated passage and an additional reflecting means located at the end of said passage, a second opening opposite said additional reflecting means, said projector being located to direct said image into said first opening and onto the reflecting means disposed opposite this opening, the reflecting means opposite said first opening being located to direct the image along said passage to said additional reflecting means, this additional reflecting means being located to direct the image through said second opening, through the opening defined by said housing, and then onto said second surface within said housing, said first and second surfaces within the housing being disposed so that the direction of throw of said image from said projector causes the image to reflect off said second surface to said first surface, back to said second surface whereby the separate projections on said second surface are superimposed, and then onto said screen.

References Cited by the Examiner

UNITED STATES PATENTS

| | | | |
|---|---|---|---|
| 2,084,795 | 6/37 | Donle | 88—16.6 |
| 2,163,593 | 6/39 | Draeger | 88—24 |
| 2,381,997 | 8/45 | Bolsey | 88—24 |
| 2,633,774 | 4/53 | Rounsefell | 88—24 |
| 2,880,646 | 4/59 | Brothers | 88—24 |
| 3,051,040 | 8/62 | Davis | 88—24 |

FOREIGN PATENTS 230,292   3/44   Switzerland.

NORTON ANSHER, *Primary Examiner.*

EMIL G. ANDERSON, *Examiner.*